United States Patent
Rodriguez et al.

(10) Patent No.: US 6,580,784 B2
(45) Date of Patent: Jun. 17, 2003

(54) SYSTEM AND METHOD FOR URGENT PHONE MESSAGE DELIVERY

(75) Inventors: Herman Rodriguez, Austin, TX (US); Newton James Smith, Jr., Austin, TX (US); Clifford Jay Spinac, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 234 days.

(21) Appl. No.: 09/730,404

(22) Filed: Dec. 4, 2000

(65) Prior Publication Data

US 2002/0067806 A1 Jun. 6, 2002

(51) Int. Cl.$^7$ .......................... H04M 1/64; H04M 1/57; H04M 3/50; H04M 3/537; H04Q 7/20
(52) U.S. Cl. ................... 379/88.12; 379/88.19; 379/88.22; 379/142.06; 379/211.02; 455/432
(58) Field of Search ................. 379/67.1, 88.11, 379/88.12, 88.15, 88.19, 88.2, 88.21, 88.22, 88.23, 142.01, 142.06, 142.08, 211.02, 211.03, 211.04; 455/432, 433, 435

(56) References Cited

U.S. PATENT DOCUMENTS 5,787,162 A * 7/1998 Javitt ........................ 370/259
6,031,899 A * 2/2000 Wu ........................... 379/133
6,215,859 B1 * 4/2001 Hanson ..................... 379/88.12

* cited by examiner

Primary Examiner—Harry S. Hong
(74) Attorney, Agent, or Firm—Joseph T. Van Leeuwen; Robert M. Carwell (57) ABSTRACT

A system and method for notifying a user of urgent phone messages is provided. When a telephone or text message is received by the phone answering system, a priority is determined for the message. If the telephone call is identified as an urgent telephone call, the system repeatedly dials the subscriber's phone in order to notify the user of the urgent message. In one embodiment, multiple locations, such as pagers, email addresses, and alternate phone numbers are contacted in order to inform the user of the urgent message. When the user is contacted, the urgent messages are played for the user. In a mobile telephone system environment, determinations are made as to whether the user is operating in roam mode before messages are delivered. A caller id function can further be included to selectively allow messages to be identified as urgent based upon the identification of the caller.

28 Claims, 5 Drawing Sheets

SYSTEM AND METHOD FOR URGENT PHONE MESSAGE DELIVERY

BACKGROUND OF THE INVENTION

1. Technical Field

The present invention relates in general to a method and system for handling urgent messages. More particularly, the present invention relates to a system and method for a telephone answering system to notify a user of received urgent messages.

2. Description of the Related Art

Telephone answering systems range from large organizational voice mail systems to stand alone answering machines. When a caller dials a phone number and the receiver does not answer, the answering system prompts the caller to leave a message. Phone messages may also be received, particularly in a voice mail system, by having one person forward a message to one or more people. Users of the telephone answering system, sometimes called subscribers, usually learn of new messages by a visual indicator on the phone or answering machine. In a voice mail system, the subscriber is usually notified via a short-message-service indicator (such as a blinking light on the phone) that voice mail is pending. Likewise, a stand alone answering machine usually notifies the user that one or messages are pending by a blinking light. In addition, these systems sometimes provide a digital indicator showing the number of new messages that the user has received.

Mobile telephone systems often provide voice mail capabilities for their customers. If someone attempts to call the user's mobile telephone, such as a cellular telephone, and the user is unavailable, the phone is turned off, or the phone is out of range, the mobile telephone system's answering service prompts the caller to leave a message.

In some of these mobile telephone systems, voice mail cannot be delivered when the mobile telephone is out of range or is operating in roam mode. A mobile telephone can be in either analog or digital roam mode when it is outside its local operating area. Its local operating area may be defined by a geographic boundary or based upon the company providing service in a particular area. In these systems, the user is notified of voice mail when they are no longer out of range or are no longer operating in roam mode.

Telephone answering systems can also be accessed by a user calling the system and, using a pin code, checking to see if any new messages have been received. In a voice mail system, a central voice mail phone number is often used by subscribers. Subscribers dial the phone number and are prompted for their office phone number (or extension) and a pin code. In a stand alone answering machine, the user calls his phone number and waits for the answering machine to pick up. When the answering machine picks up (i.e., the greeting begins), the user breaks into the administrative functions by pressing one or more pin code keys. Once the pin code is entered, the answering machine informs the user whether any messages are pending.

Answering systems tend to perform adequately in receiving and storing messages. Some systems allow callers to leave lengthy messages while other systems limit call lengths to 30 or 60 seconds. Older answering systems store messages sequentially on magnetic tape, while newer systems tend to store messages on nonvolatile digital storage. Large systems, such as corporate email systems and personal computer based systems, may also store messages on nonvolatile disk drives offering larger storage capacities.

While traditional answering systems adequately store messages, they are challenged in their ability to distinguish between different types of calls. For example, critical, or urgent, calls are handled in the same manner as mundane, or unimportant calls. In addition, these systems are challenged in their ability to notify subscribers of calls. As discussed above, most systems provide simple visual indicators. If the user is away from the answering system, the user needs to call into the answering system to determine if new calls have been received. This can cause delays in responding to messages, especially urgent messages, that may be time critical.

Mobile telephone answering systems face additional challenges. The user is often not informed of messages until the user is in range or no longer in roam mode. This causes further delay in receiving messages.

What is needed, therefore, is a way to notify a user of messages other than simple visual indicators. Further, what is needed is a way to discern between urgent and non-urgent messages and inform the user of the urgent messages on a timely basis. Regarding mobile telephones, what is further needed is a way to inform a user of urgent messages while the user is in roam mode or is in an area where voice mail indicators or text messages are not forwarded. Finally, what is needed is a way to selectively forward urgent messages to an alternate phone number in the event the user is away for an extended time period.

SUMMARY

It has been discovered that a telephone answering system can receive a priority along with a message. The message received can be an analog voice message or a digital text message. Regarding mobile telephones, what is further needed is a way to inform a user of urgent messages while the user is in roam mode or is in an area where voice mail indicators or text messages are not forwarded. The subscriber can indicate whether he would like all calls treated as urgent calls, all calls treated as normal calls, or select which callers are treated as urgent based upon caller id information. The subscriber can also allow the caller to indicate a priority. If no priority is indicated, the system can treat the call as a normal priority message.

The telephone answering system periodically tries to reach the subscriber at the subscriber's telephone number. If the system is part of a mobile telephone system, then the subscriber can indicate whether he wishes to receive urgent messages when in roam mode. When the system successfully reaches the subscriber, the urgent message or messages are played. The user can delete the message or retain the message. In one embodiment, the user can also request that normal messages be played after the urgent messages have finished playing.

An urgent message forwarding feature allows urgent messages to be forwarded to one or more alternate locations. The alternate locations may include a pager in which a digital message is left notifying the subscriber to call for messages. Another alternate location may be an email address in which information about urgent calls is sent to the subscriber's email address. Alternate phone numbers can also be used, in which case the phone mail system contacts such phone numbers and plays the urgent messages when the phone is answered, perhaps after a personal identification number (PIN) is entered.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

DETAILED DESCRIPTION

The following is intended to provide a detailed description of an example of the invention and should not be taken to be limiting of the invention itself. Rather, any number of variations may fall within the scope of the invention which is defined in the claims following the description.

Figure 1A:
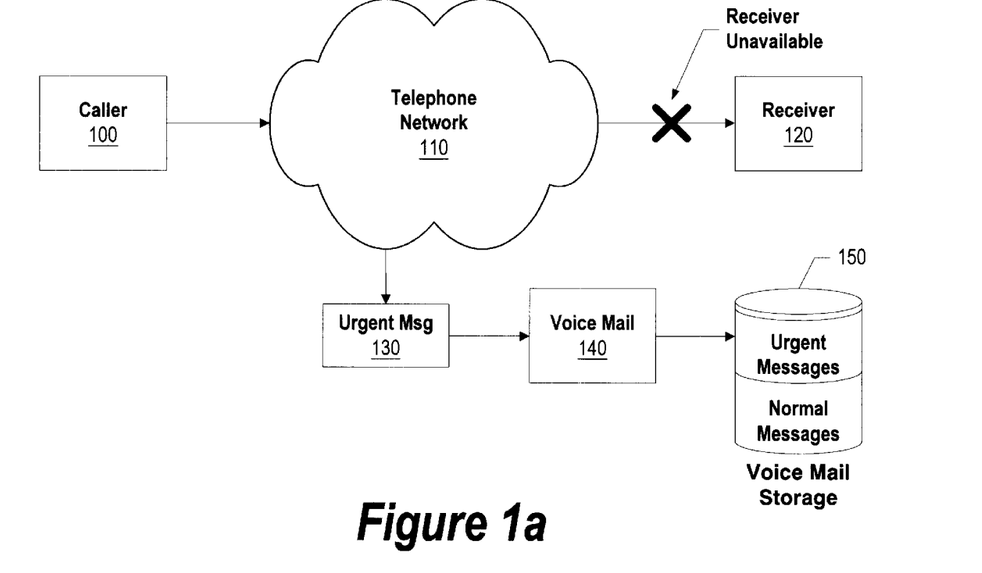
FIG. 1a is a system diagram of a caller Leaving an urgent message.

FIG. 1a shows a system diagram of a caller leaving an urgent message. Caller 100 dials a phone number corresponding with unavailable receiver 120. The phone signal travels through telephone network 110 in order to ring the phone corresponding with unavailable receiver 120. When unavailable receiver 120 does not answer, telephone answering system 140 answers and prompts caller 100 for a message and a priority. Telephone network 110 may include a mobile telephone network, the public switched telephone network, or a private telephone exchange within an organization.

While telephone answering system 140 is shown attached to telephone network 110, in some embodiments, such as a stand alone answering machine, telephone answering system 140 is included in or attached to the receiving telephone. In addition, as used herein, a message stored on an answering system may be any type of message that can be left on the particular answering system. Traditional answering systems record a caller's analog voice and store the caller's vocal message in either a digital or analog form. Some answering systems also receive digital text messages left by a caller using email or a device, such as a touch-tone phone, an alpha-numeric pager, or a personal digital assistant (PDA).

Caller 100 indicates that the message is an urgent message. Telephone answering system 140 responds by storing the message as an urgent message within voice mail storage 150. Voice mail storage is shown with two storage areas—one for urgent messages and another for normal messages. Other embodiments may store urgent and normal messages in the same storage area and indicate through flags and a common index which of the messages are urgent messages.

Figure 1B:
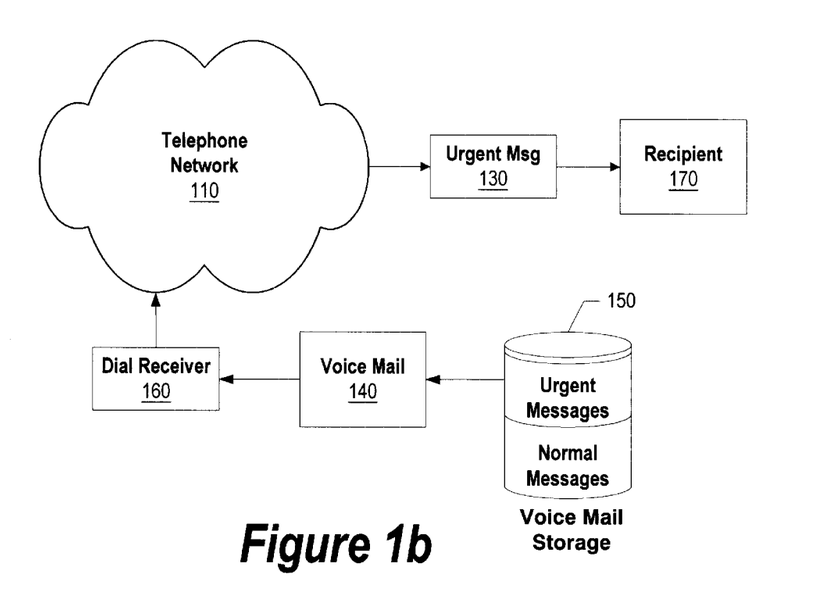
FIG. 1b is a system diagram of the voice mail system informing the user of urgent messages.

FIG. 1b shows a system diagram of the voice mail system informing the user of urgent messages left by the caller in FIG. 1a. Periodically, telephone answering system 140 attempts to notify receiver 120 that he has one or more urgent messages in voice mail storage 150. In some embodiments, where the telephone answering system is attached to or integrated in with the telephone, the system sends a ring signal to the telephone or emits an audible ring from telephone answering system 140 in order to get the user's attention and notify him that one or more urgent messages are waiting.

In other embodiments, such as the one shown in FIG. 1b, telephone answering system 140 is connected to the user's telephone through telephone network 110. For example, in a mobile telephone system the voicemail system is separate from the individual mobile telephones that use the network. In a mobile telephone system, the mobile telephone network connects the mobile telephone voicemail with the individual mobile telephones. Likewise, a voicemail system used by an organization often connects to individuals' phones using the organization's internal telephone network, often managed by one or more specialized computers (i.e. a PBX). In these systems, telephone answering system 140 dials (step 160) urgent message recipient 170 using telephone network 110. Receiver 120 from FIG. 1a may be the same person as recipient 170, or may be another person designated by the receiver to receive messages. If urgent message recipient 170 answers, urgent message 130 is played so the recipient receives the urgent message in a timely manner. In addition, if the stored message is a digital text message, the message may be converted to an audible message using speech synthesis software depending on the type of device the recipient is using. If the recipient is receiving his messages from a traditional telephone, any digital text messages would be converted to an audible signal using the voice synthesis software. However, if the recipient is using a device with a text display, such as a mobile telephone or a PDA, then the digital message may appear on the device rather than converting the text message into an audible message.

On the other hand, if the recipient is unavailable, telephone answering system 140 waits for a period of time to elapse (e.g. 15 minutes) before attempting to contact the recipient again. This process is continued until the recipient answers the phone and receives the urgent messages.

Figure 2:
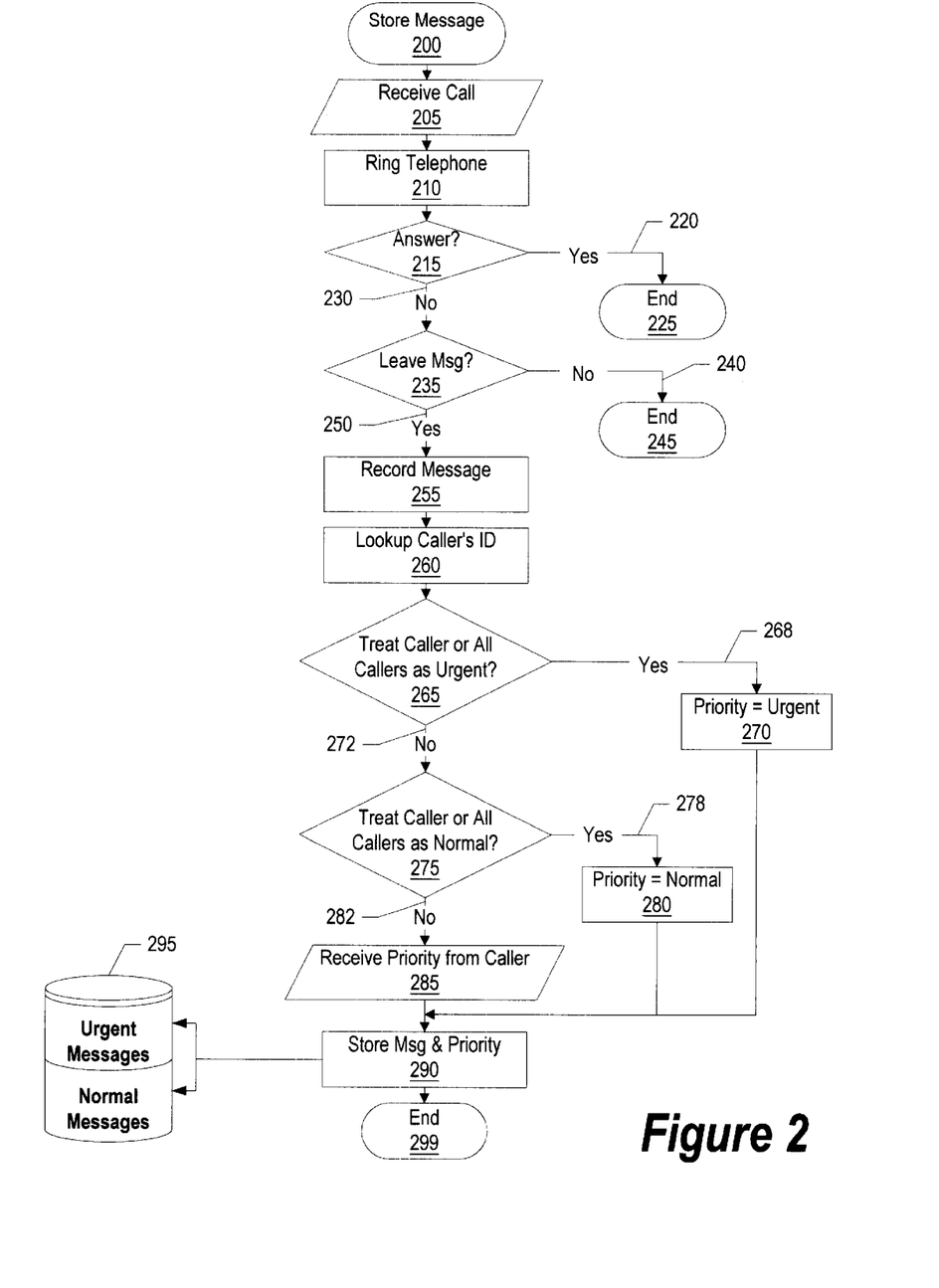
FIG. 2 is a flowchart of the voice mail system storing a caller's message and a priority corresponding with the message.

FIG. 2 is a flowchart of the voice mail system storing a caller's message and a priority corresponding with the message. Processing commences at 200 whereupon the system receives a call (input 205). The receiver's telephone is rung (step 210) a predetermined number of times before the answering system prompts the caller for a message. If the receiver answers the phone (decision 215), "yes" branch 220 is taken whereupon processing ends at 225 (since no message needs to be taken). On the other hand, if the receiver does not answer, decision 215 branches to "no" branch 230 whereupon the caller is prompted to leave a message. If the caller does not decide to leave a message, decision 235 branches to "no" branch 240 and processing ends at 245. On the other hand, if the caller decides to leave a message (usually accomplished by speaking after the answering system provided tone), decision 235 branches to "yes" branch 250 whereupon the caller's message is recorded (step 255). In some embodiments using Caller ID services, the caller's ID (i.e. phone number) is compared to a list of IDs maintained by the telephone answering system. The list of IDS maintained by the telephone answering system may determine whether this caller should automatically be treated as an urgent or normal caller. In this manner, important clients can always be identified as urgent, while calls from a particular colleague can always be identified as normal priority calls. In addition, the user may decide to treat all calls as urgent or normal. If the user has decided to treat this particular caller as urgent or has decided to treat all calls as urgent, decision 265 branches to "yes" branch 268 whereupon the priority is set to urgent (step 270). If the user has not made either of these choices, decision 265 branches to "no" branch 272 whereupon another decision is encountered. Decision 275 determines whether the user has decided to treat this particular caller as normal or has decided to treat all calls as normal. If the user made either of these decisions, decision 275 branches to "yes" branch 278 whereupon the priority is set to normal (step 280). On the other hand, if the user has not made either of these choices, "no" branch 282 is taken whereupon the caller is prompted for a priority (input 285). A further enhancement can be provided by using the caller identification information to determine whether a particular caller is allowed to enter a priority at input 285. In this fashion, priority messages can be limited to those callers, such as important customers or clients, that the receiver determines may have urgent messages. If the caller hangs up or does not otherwise enter a priority, the system can set the message priority to normal. The message and priority are stored in nonvolatile storage (step 290). Nonvolatile storage 295 includes an area for urgent messages and an area for normal priority messages. As explained earlier, the messages may be stored in a common area and distinguished as either normal or urgent by setting a flag in an indexed table with an entry in the table for each message stored. After the message and priority are stored, processing terminates at end 299.

Figure 3:
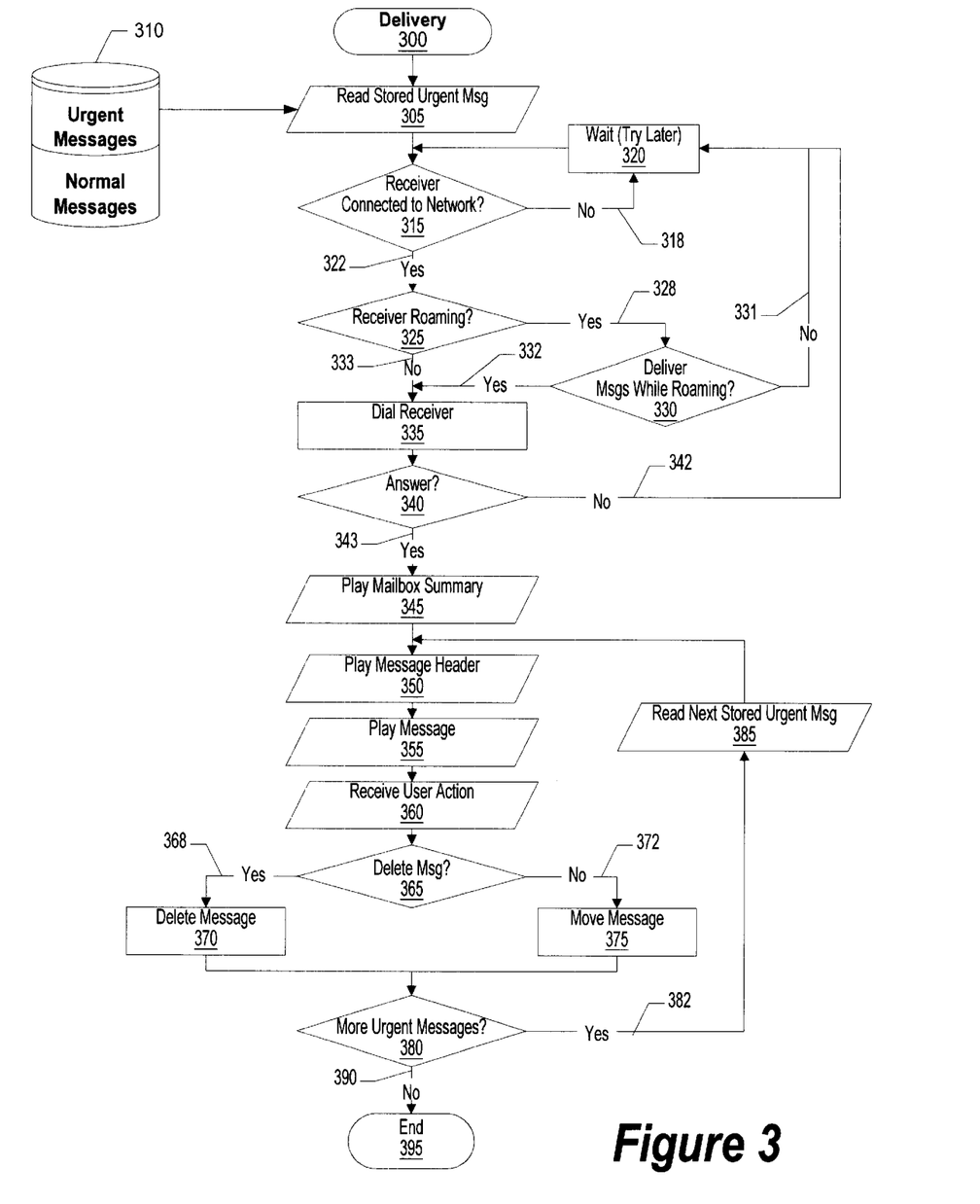
FIG. 3 is a flowchart of the voice mail system delivering urgent messages to the caller's telephone.

FIG. 3 is a flowchart of the voice mail system delivering urgent messages to the user's telephone. Processing commences at 300 whereupon urgent message data is read (input 305) from voicemail storage 310. In a mobile telephone implementation, a check is made to determine whether the receiver (i.e., voice mail subscriber) is connected to the mobile telephone network (decision 315). If the receiver is not connected to the mobile telephone network (i.e., the receiver's mobile telephone is turned off or is out of range), decision 315 branches to "no" branch 318 whereupon the system waits (step 320) a predetermined amount of time before looping back and determining once again if the receiver is connected to the network. This looping continues until the receiver is connected to the mobile telephone network, which in turn causes decision 315 to branch to "yes" branch 322. Next, in a mobile telephone network implementation, a check is made to determine whether the receiver is in roam mode (decision 325). Because the cost of connecting while in roam mode is usually much higher than when the receiver is in digital mode or is in the receiver's local area, some subscribers may not want to receive any messages while operating in roam mode. If the receiver is roaming, decision 325 branches to "yes" branch 328 whereupon a determination is made as to whether the subscriber wants to receive messages while roaming (decision 330). If the subscriber does not want to receive urgent messages while roaming, decision 330 branches to "no" branch 331 which waits for a predetermined amount of time (step 320) before looping back and checking the subscriber's status once again. This looping will continue until the user is not operating in roam mode in which case decision 321 branches to "no" branch 333 to continue processing. On the other hand, if the user does wish to receive urgent messages while operating in roam mode, decision 330 branches to "yes" branch 332 and processing continues.

In an implementation not involving a mobile telephone network, decisions 315 and 325 would not have to be made and processing would dial the subscriber's telephone (step 335) after reading the urgent telephone information (input 305). In a mobile telephone implementation, the processing described above for decisions 315 and 325 would occur before the subscriber's mobile telephone is dialed (step 335). In either case, after the phone is dialed, a determination is made as to whether the subscriber answers the phone (decision 340). If the subscriber does not answer the phone or if an answering system answers the call, "no" branch 342 is taken whereupon the call is terminated and processing waits for a predetermined amount of time (step 320) before looping back and checking the subscriber's status once again. This looping will continue until the user answers the phone in which case decision 340 branches to "yes" branch 343 to continue processing.

When the user answers the phone, a phone mailbox summary is played for the user (output 345) informing the user of the number of urgent (and possibly non-urgent) messages that are pending. For added security, a personal identification number (PIN code), or other security code could be required before the system begins playing the urgent messages at output 345. If the user enters the correct code, the urgent messages would be played and if a correct code is not entered processing would be terminated. In this way, the confidentiality of the user's urgent messages would not be compromised by playing the messages to anyone that answered the phone.

The header for the first urgent message that was read during input 305 is played for the user informing the user of the date and time that the message was received (output 350). The message is then played for the user (output 355). The user is often given choices on actions to perform to the previously played message. The system receives the user's action (input 360) and responds accordingly. Decision 365 determines whether the user wants to delete the message. If the user requests deletion of the message, "yes" branch 368 is taken whereupon the message is deleted (step 370) from voice mail storage 310. On the other hand, if the previously played message is not to be deleted, "no" branch 372 is taken whereupon the urgent message is moved (step 375) from the urgent message area to the normal message area (or flags corresponding with the message are set accordingly) so that the system does not continue to call the user and play the same urgent messages repeatedly.

In addition, if multiple phone numbers are being contacted to inform the user of urgent messages (see FIG. 4, predefined process 470 that creates one or more phone threads), the processing threads contacting other phone numbers are terminated when the user receives the urgent phone messages. In this manner, the user does not have to listen to the same urgent phone messages at multiple phones.

A check is then made to determine whether there are more urgent messages (decision 380). If there are more messages, decision 380 branches to "yes" branch 382 whereupon the next urgent message is read (input 385) from voicemail storage 310 and processing loops back to play the next message's header and contents (outputs 350 and 355). When all urgent messages have been played, decision 380 branches to "no" branch 390 and processing ends at 395. In some implementations, the user is asked whether he would like to play any non-urgent (i.e. normal priority) messages before processing terminates. If the user wishes to listen to non-urgent messages than these messages are also played before processing ends at 395.

Figure 4:
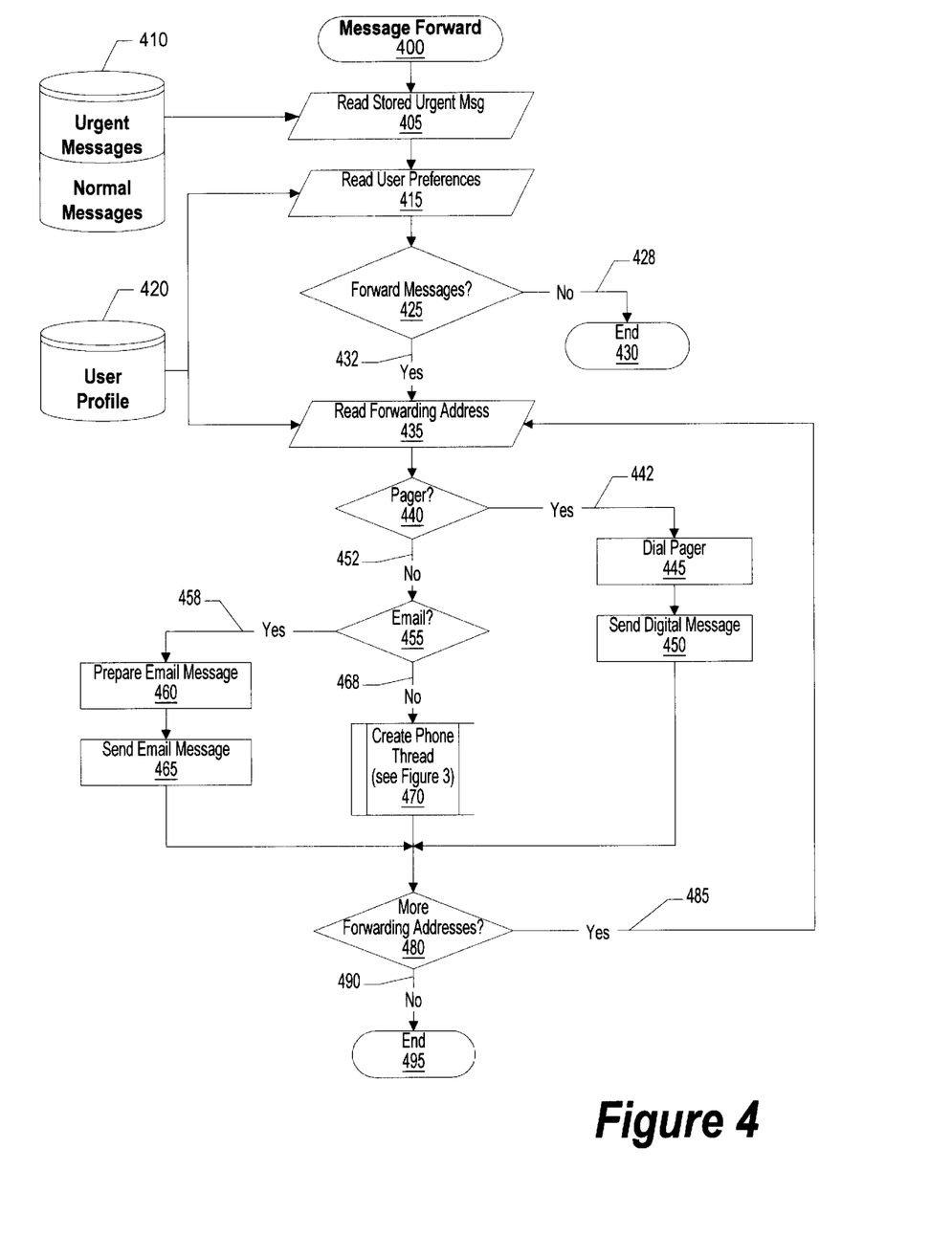
FIG. 4 is a flowchart of the voice mail system forwarding urgent messages to alternative phone numbers.

FIG. 4 is a flowchart of the voice mail system forwarding urgent messages to alternative phone numbers. Processing commences at 400 whereupon urgent message data is read (input 405) from voice mail storage 410. User preferences are read (input 415) from user profile 420. The user can specify one or more alternate locations to be contacted in the event of urgent messages. These alternate locations are stored in user profile 420. User profile 420 is a file or database stored on nonvolatile storage accessible to the voice mail system. In a mobile telephone network, user profiles would be stored at the mobile telephone company. In a corporate voicemail setting, the user profiles would be stored in a location accessible to the centralized voicemail system. In a stand alone telephone answering system, such as an answering machine, the alternative locations are stored in a nonvolatile storage area within the answering machine.

Decision 425 is made to determine whether the user wants to have urgent messages forwarded to alternate locations. If the user does not wish to forward messages, decision 425 branches to "no" branch 428 whereupon message forwarding processing ends at 430. On the other hand, if the user has requested message forwarding, "yes" branch 432 is taken whereupon the first forwarding address is read (input 435) from user profile 420. If the first Forwarding address is a pager, decision 440 branches to "yes" branch 442.

Pager processing includes dialing the specified pager number (step 445) and sending a digital message (step 450) informing the user of the urgent message. Simple pagers may only accept a limited number of digits as a message in which case the voicemail number or other preset number (i.e. "911—911") is left to inform the user that urgent messages have been received. In more complex alphanumeric pagers, a variety of information can be included such as the date and time of the message, the caller id information corresponding to the caller that left the message, and even the contents of the message using speech recognition software.

If the first forwarding address is not a pager, decision 440 branches to "no" branch 442. Another decision is made (decision 455) to determine whether the first forwarding address is an email address. If the forwarding address is an email address, "yes" branch 458 is taken whereupon an email message is prepared (step 460). The preparation of the email address may include information about all urgent messages in the user's voicemail. Similar to an alphanumeric pager, a variety of information can be included in the email message including the date and time of the message, the caller id information corresponding to the caller that left the message, and even the contents of the message using speech recognition software. After the email message has been prepared, it is sent (step 465) to the email address specified in user profile 420.

If the first forwarding address is not a pager and is also not an email address, "no" branch 468 is taken to forward the urgent message to a phone number. A separate execution thread is created (predefined process 470) to handle the phone message since the thread may have to wait some amount of time for the user to answer the phone and receive the messages (see FIG. 3 for details in contacting a phone number and delivering urgent messages to the user via phone).

After the first forwarding address is handled, decision 480 determines whether more forwarding addresses have been specified by the subscriber. If more forwarding addresses have been specified, "yes" branch 485 is taken which loops back to read the next forwarding address and process it accordingly. This looping continues until all forwarding addresses specified by the user have been processed. When there are no more forwarding addresses to process, decision 480 branches to "no" branch 490 and message forwarding processing ends at 495.

Figure 5:
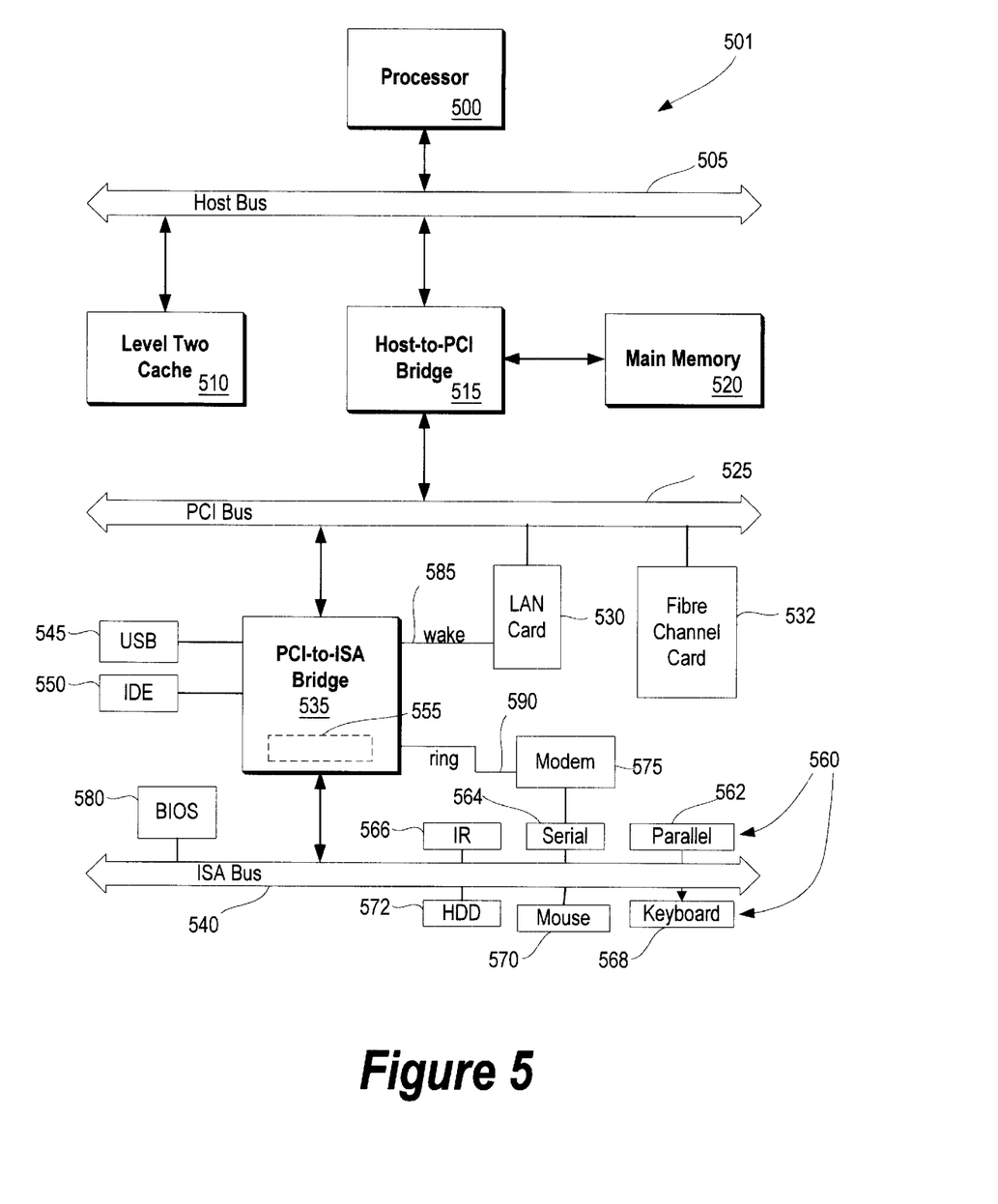
FIG. 5 is a block diagram of an information handling system capable of implementing the present invention.

FIG. 5 illustrates information handling system 501 which is a simplified example of a computer system capable of performing the processing described herein. Computer system 501 includes processor 500 which is coupled to host bus 505. A level two (L2) cache memory 510 is also coupled to the host bus 505. Host-to-PCI bridge 515 is coupled to main memory 520, includes cache memory and main memory control functions, and provides bus control to handle transfers among PCI bus 525, processor 500, L2 cache 510, main memory 520, and host bus 505. PCI bus 525 provides an interface for a variety of devices including, for example, LAN card 530. PCI-to-ISA bridge 535 provides bus control to handle transfers between PCI bus 525 and ISA bus 540, universal serial bus (USB) functionality 545, IDE device functionality 550, power management functionality 555, and can include other functional elements not shown, such as a real-time clock (RTC), DMA control, interrupt support, and system management bus support. Peripheral devices and input/output (I/O) devices can be attached to various interfaces 560 (e.g., parallel interface 562, serial interface 564, infrared (IR) interface 566, keyboard interface 568, mouse interface 570, and fixed disk (HDD) 572) coupled to ISA bus 540. Alternatively, many I/O devices can be accommodated by a super I/O controller (not shown) attached to ISA bus 540.

BIOS 580 is coupled to ISA bus 540, and incorporates the necessary processor executable code for a variety of low-level system functions and system boot functions. BIOS 580 can be stored in any computer readable medium, including magnetic storage media, optical storage media, flash memory, random access memory, read only memory, and communications media conveying signals encoding the instructions (e.g., signals from a network). In order to attach computer system 501 to another computer system to copy files over a network, LAN card 530 is coupled to PCI bus 525 and to PCI-to-ISA bridge 535. Similarly, to connect computer system 501 to an ISP to connect to the Internet using a telephone line connection, modem 575 is connected to serial port 564 and PCI-to-ISA Bridge 535.

While the computer system described in FIG. 5 is capable of executing the invention described herein, this computer system is simply one example of a computer system. Those skilled in the art will appreciate that many other computer system designs are capable of performing the invention described herein.

One of the preferred implementations of the invention is an application, namely, a set of instructions (program code) in a code module which may, for example, be resident in the random access memory of the computer. Until required by the computer, the set of instructions may be stored in another computer memory, for example, on a hard disk drive, or in removable storage such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For a non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method of notifying a user of voicemail messages, said method comprising:
   receiving a message from a caller;
   dialing a telephone number corresponding with the user in response to the receiving and in response to determining whether a mobile telephone corresponding with the telephone number is not operating in a roam mode; and
   informing the user of the message in response to the user answering the mobile telephone.

2. The method as described in claim 1 further comprising:
   identifying the message as urgent or non-urgent;
   wherein the dialing is performed in response to identifying the message as urgent.

3. The method as described in claim 2 wherein the identifying further includes receiving a caller id corresponding with the caller; and
   matching the received caller id with a list of caller identifications.

4. The method as described in claim 1 further comprising:
   receiving an authorization code from the user;
   authenticating the user based on the receiving;
   wherein the informing is performed in response to the authenticating.

5. The method as described in claim 1 wherein the informing further includes playing the message to the user.

6. The method as described in claim 1 further comprising:
   determining one or more forwarding locations corresponding to the user;
   wherein the forwarding locations include at least one of an email address, a pager number, and a forwarding telephone number;
   sending a message waiting notification to at least one of the forwarding locations.

7. The method as described in claim 1 further comprising:
   repeatedly dialing the telephone number in response to the user not answering.

8. The method as described in claim 1 wherein the received message includes a digital text message, the method further comprising:
   converting the digital text message into an audible message;
   wherein the informing includes playing the audible message to the user.

9. The method as described in claim 1 wherein the received message includes a digital text message, and the informing further includes displaying the digital text message on a display attached to the user's telephone.

10. The method as described in claim 1 further comprising:
    receiving a priority from the caller, the priority identifying whether the caller's message is urgent.

11. An information handling system comprising:
    one or more processors;
    a memory accessible by the processors;
    a nonvolatile storage device accessible by the processors; and
    a voicemail notification tool, the voicemail notification tool including:
      means for receiving a message from a caller;
      means for dialing a telephone number corresponding with the user in response to the received message and in response to determining whether a mobile telephone corresponding with the telephone number is not operating in a roam mode; and
      means for informing the user of the message in response to the user answering the mobile telephone.

12. The information handling system as described in claim 11 further comprising:
    means for identifying the message as urgent or non-urgent;
    wherein the means for dialing is performed in response to identifying the message as urgent.

13. The information handling system as described in claim 12 wherein the means for identifying further includes means for receiving a caller id corresponding with the caller; and
    means for matching the received caller id with a list of caller identifications.

14. The information handling system as described in claim 11 wherein the means for informing further includes playing the message to the user.

15. The information handling system as described in claim 11 further comprising:
    means for determining one or more forwarding locations corresponding to the user, wherein the forwarding locations include at least one of an email address, a pager number, and a forwarding telephone number; and
    means for sending a message waiting notification to at least one of the forwarding locations.

16. The information handling system as described in claim 11 further comprising:
    means for repeatedly dialing the telephone number in response to the user not answering.

17. The information handling system as described in claim 11 wherein the received message includes a digital text message, the information handling system further comprising:
    a speech synthesis software tool for converting digital text into an audible message;
    means for converting the digital text message into an audible message;
    wherein the means for informing includes means for playing the audible message to the user.

18. The information handling system as described in claim 11 wherein the received message includes a digital text message, the information handling system further comprising:

a display attached to the user's telephone; and wherein the voicemail notification tool includes means for displaying the digital text message on the display.

19. The information handling system as described in claim 11 further comprising:

means for receiving a priority from the caller, the priority identifying whether the caller's message is urgent.

20. A computer program product stored in a computer operable media for notifying a user of voicemail messages, said computer program product comprising:

means for receiving a message from a caller;

means for dialing a telephone number corresponding with the user in response to the means for receiving and in response to determining whether a mobile telephone corresponding with the telephone number is not operating in a roam mode; and means for informing the user of the message in response to the user answering the mobile telephone.

21. The computer program product as described in claim 20 further comprising:

means for identifying the message as urgent or non-urgent;

wherein the means for dialing is performed in response to identifying the message as urgent.

22. The computer program product as described in claim 21 wherein the means for identifying further includes means for receiving a caller id corresponding with the caller; and means for matching the received caller id with a list of caller identifications.

23. The computer program product as described in claim 21 wherein the means for informing further includes playing the message to the user.

24. The computer program product as described in claim 21 further comprising:

means for determining one or more forwarding locations corresponding to the user, wherein the forwarding locations include at least one of an email address, a pager number, and a forwarding telephone number; and means for sending a message waiting notification to at least one of the forwarding locations.

25. The computer program product as described in claim 20 further comprising:

means for repeatedly dialing the telephone number in response to the user not answering.

26. The computer program product as described in claim 20 wherein the received message includes a digital text message, the computer program product further comprising:

means for converting the digital text message into an audible message;

wherein the means for informing includes means for playing the audible message to the user.

27. The computer program product as described in claim 20 wherein the received message includes a digital text message, and the means for informing further includes means for displaying the digital text message on a display attached to the user's telephone.

28. The computer program product as described in claim 20 further comprising:

means for receiving a priority from the caller, the priority identifying whether the caller's message is urgent.

* * * * *

UNITED STATES PATENT AND TRADEMARK OFFICE
CERTIFICATE OF CORRECTION

PATENT NO. : 6,580,784 B2
DATED : July 17, 2003
INVENTOR(S) : Rodriguez et al.

It is certified that error appears in the above-identified patent and that said Letters Patent is hereby corrected as shown below:

<u>Column 12,</u>
Line 2, please delete "21" and insert -- 20 --.

Signed and Sealed this

Second Day of December, 2003

JAMES E. ROGAN
*Director of the United States Patent and Trademark Office*